Sept. 15, 1953          J. H. GOODE            2,652,268
                     MULTIPLE SEAT UNION
                     Filed Feb. 28, 1949

JOSEPH H. GOODE
    INVENTOR.

BY Lester B. Clark
   & Ray L. Smith
   ATTORNEYS

Patented Sept. 15, 1953

2,652,268

UNITED STATES PATENT OFFICE 2,652,268

MULTIPLE SEAT UNION

Joseph H. Goode, Houston, Tex.

Application February 28, 1949, Serial No. 78,838

2 Claims. (Cl. 285—122)

The invention relates to a union adapted to provide a seal between the members thereof along a multiplicity of surfaces.

It is an object of this invention to provide a union in which the members thereof are adapted to provide several sealing surfaces.

It is a further object of this invention to provide a union of this class having metal to metal sealing surfaces and additional surfaces sealed by a sealing element.

It is still a further object of this invention to provide a union of this class in which the seal thereof is compressed between a plurality of confining surfaces as the metal to metal contact surfaces are brought into contact.

It is still a further object of this invention to provide a union of this class which is easily assembled and readily installed in a line as a pipe line.

Other and further objects of this invention will be obvious when the specification is considered in connection with the drawings, in which.

Figure 2:
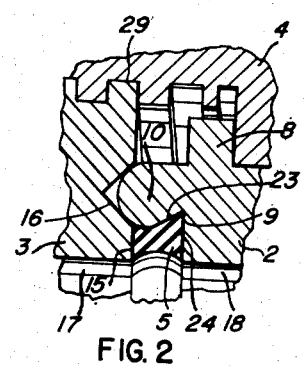
Fig. 2 is a fragmentary section showing the sealing surfaces of the union in enlarged detail.

The union 1 comprises a male member 2 and a female member 3 interconnected by a connector 4 so that a seal 5 is compressed between the ends of the male and female members.

The male member has an internally threaded section 6 adapted for connection to a pipe; a knurled external section 7 to abet manual operation of the union; a flange portion 8; a peripheral internal groove 9 at one end thereof; and a seating ring 10 which defines a side of the groove 9 and which has a seating surface 11 which is substantially semi-circular in cross section.

The female member 3 has an internal threaded section 12 to receive a pipe; a knurled external surface 13; and enlarged externally threaded section 14; and one end 15 thereof has a groove 16 therein which is substantially of a V-cross section. A bore 17 through the female member is of substantially the same diameter as the bore 18 through the male member.

The members are connected by the connector 4 which has an internally threaded section 19 adapted to engage with the section 14 of the female member, and the connector additionally has a shoulder 21 at one end thereof for engagement with the flange 8 of the male member to bring the male and female members into end to end abutment when the connector is threaded upon the female member.

The end surfaces 15 of the female member, the inner side 23 of the projection 10, and the radially extending face 24 of the peripheral groove 9 define the surface within which a seal 5 is deformed into sealing contact when the union is assembled and threaded substantially full up.

It can be said that a union of this construction is a multiple seated union in that there is a metal to metal seat on either side of the groove 16 and also a metal to metal seat or contact between the shoulder 21 and the flange 8. There are additionally three surfaces, as hereinabove stated, which define the confines of the seal 5 and it should especially be noted that the side 23 of the projection 10 and the end surface 24 of the groove 9 defines a V-groove into which the seal 5 is deformed to insure positive sealing.

Additionally, the side 23 of the projection 10 and the end surface 15 of the female member also define a modified V-groove into which the seal 5 may be deformed. With a union of this construction a multiplicity of sealing surfaces are provided past which fluid would have to leak to escape therefrom.

Additionally, although the bore 26 through the end 27 of the connector is of a dimension to slide along the male member 2 as the union is assembled, this bore surface may also offer some resistance to the passage of fluid in the last resort, when the connector is threaded full up on the female member 3. The threads 29 of the connector may be of such contour as to permit easy threading and unthreading of the union while at the same time permitting firm locking together of the connector 4 and female member 3 when these members are threaded full up.

Figure 1:
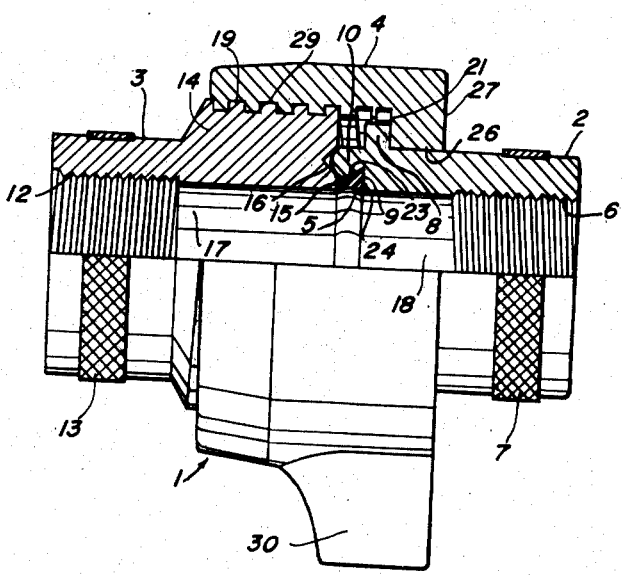
Fig. 1 is an elevation, part in section, through the union.

The connector 4 has ears 30 thereon radially spaced therearound, one of such ears being shown in Fig. 1. These ears provide finger grips to facilitate assembly and disassembly.

This invention is not limited to the specific construction disclosed as the member 3 might be the male member and have the projection 10 thereon while the V-groove 16 might be formed in the member 2. Also, it is possible to provide a construction within the scope of this invention in which the connector 4 might be threadable on the member 2 while the member 3 would provide a flange 8 against which the shoulder 21 of the connector 4 would abut.

Broadly, this invention considers a union which is adapted to provide a multiplicity of sealing surfaces confining a sealing element as the non-metallic seal 5, and which additionally provides a plurality of metal to metal sealing surfaces to apply against the escape of the fluid from the union.

What is claimed is:

1. In a union, the combination of a hollow, tubular female member, a hollow tubular male member, and a connector, one of said members having an externally threaded section and the other of said members having a radially outwardly extending enlargement, said connector having a shoulder and an internally threaded section adapted for engagement with said externally threaded section and said shoulder being adapted to bear upon said enlargement whereby said connector may draw the inner ends of said members toward each other as said threaded sections are inter-engaged, said female member having a radially extending end surface with a substantially V-shaped annular groove therein spaced from the inner periphery thereof, said male member having a radially extending end face and an annular projection having a convex forward face to contact the opposite sides of said female member groove, the inner surface of said projection sloping inwardly from the inner edge of said groove and in the direction of said male member end face and then sloping outwardly to join said male member end face thereby forming a substantially V-shaped groove between said projection and said male member end face, and an annular, deformable sealing member positioned with one side face to engage said female member end face whereby, as said threaded sections are inter-engaged, the outer peripheral surface of said sealing member is deformed to tightly fit against the configuration of said inwardly and outwardly sloping surfaces of said projection while said one and said other side faces thereof are pressed tightly respectively against said female member and male member end faces.

2. In a union, the combination of a hollow, tubular female member, a hollow tubular male member, and a connector, one of said members having an externally threaded section and the other of said members having a radially outwardly extending enlargement, said connector having a shoulder and an internally threaded section adapted for engagement with said externally threaded section and said shoulder being adapted to bear upon said enlargement whereby said connector may draw the inner ends of said members toward each other as said threaded sections are inter-engaged, said female member having a radially extending end surface with a substantially V-shaped annular groove therein spaced from the inner periphery thereof, the opposite sides of said groove being out of parallel with the axis of the tubular female member, said male member having a radially extending end face and an annular projection having a convex forward face to make line contact with the said opposite sides of said female member groove, the inner surface of said projection sloping inwardly from the inner edge of said groove and in the direction of said male member end face and then receding outwardly to an enlarged diameter to join said male member end face thereby forming an annular re-entrant groove between said projection and said male member end face, and an annular, deformable sealing member positioned with one side face to engage said female member end face whereby, as said threaded sections are inter-engaged, the outer peripheral surface of said sealing member is deformed to tightly fit against the configuration of said inwardly sloping and re-entrant groove surfaces of said projection while said one and said other side faces thereof are pressed tightly respectively against said female member and male member end faces.

JOSEPH H. GOODE.

References Cited in the file of this patent

UNITED STATES PATENTS

| Number | Name | Date |
|---|---|---|
| 787,144 | Bropson | Apr. 11, 1905 |
| 924,039 | Clark | June 8, 1909 |
| 2,166,232 | Brownell | July 18, 1939 |
| 2,273,017 | Boynton | Feb. 17, 1942 |